(12) United States Patent
Mongeau et al.

(10) Patent No.: US 12,027,955 B2
(45) Date of Patent: Jul. 2, 2024

(54) GENERATOR ROTOR ASSEMBLY

(71) Applicant: Vestas Wind Systems A/S, Aarhus N. (DK)

(72) Inventors: Peter Mongeau, Center Conway, NH (US); Lars Langvardt Krogh, Egå (DK); Henrik Zaar Mannik, Hammel (DK); Jens Bergmann, Eutin (DE)

(73) Assignee: Vestas Wind Systems A/S, Aarhus N. (DK)

( * ) Notice: Subject to any disclaimer, the term of this patent is extended or adjusted under 35 U.S.C. 154(b) by 216 days.

(21) Appl. No.: 17/420,727

(22) PCT Filed: Jan. 9, 2020

(86) PCT No.: PCT/DK2020/050005
§ 371 (c)(1),
(2) Date: Jul. 6, 2021

(87) PCT Pub. No.: WO2020/143888
PCT Pub. Date: Jul. 16, 2020

(65) Prior Publication Data
US 2022/0069649 A1    Mar. 3, 2022

Related U.S. Application Data

(60) Provisional application No. 62/790,558, filed on Jan. 10, 2019.

(30) Foreign Application Priority Data

Jan. 30, 2019    (DK) .......................... PA 2019 70067

(51) Int. Cl.
*H02K 1/27*    (2022.01)
*F03D 9/25*    (2016.01)
*H02K 7/18*    (2006.01)

(52) U.S. Cl.
CPC ............. *H02K 7/1838* (2013.01); *F03D 9/25* (2016.05); *F05B 2220/706* (2013.01)

(58) Field of Classification Search
CPC ........ H02K 1/276; H02K 7/1838; F03D 9/25; F05B 2220/80
See application file for complete search history.

(56) References Cited

U.S. PATENT DOCUMENTS 7,816,830 B2    10/2010    Dickes
2002/0163270 A1    11/2002    Almada
(Continued)

FOREIGN PATENT DOCUMENTS

CA    2654462 A1    12/2007
CN    104823355 A    8/2015
(Continued)

OTHER PUBLICATIONS

Translation of JP 2013-013295 A (Year: 2013).*
(Continued)

*Primary Examiner* — Sean Gugger
(74) *Attorney, Agent, or Firm* — Wood Herron & Evans LLP

(57) ABSTRACT

A generator rotor assembly (42) comprises a cylindrical ring structure (46) defining a central hollow portion and arranged to rotate around a rotational axis. The cylindrical ring structure (46) comprises a plurality of permanent magnet packages (48) arranged coaxially around the rotational axis, the permanent magnet packages (48) comprising a plurality of coaxially stacked ring-shaped segmented layers (80), a plurality of tie rod holes (86) and a plurality of tie rods (54). The coaxially stacked ring-shaped segmented layers (80) comprise a plurality of contiguous segment sheets (82) arranged around the rotational axis to form the ring-shaped layer, the stacked layers (80) being staggered such that
(Continued)

segment breaks between two contiguous segment sheets (82) in one of the layers are angularly offset with respect to segment breaks between two contiguous segment sheets (82) in an adjacent layer. The tie rod holes (86) extend axially through the layers of the permanent magnet packages (48), wherein the plurality of tie rod holes (86) of adjacent permanent magnet packages (48) are complementary in size and position, such that a plurality of tie rod bores is defined. The tie rods (54) extend through respective ones of the plurality of tie rod bores.

28 Claims, 13 Drawing Sheets

(56) References Cited

U.S. PATENT DOCUMENTS

| | | | |
|---|---|---|---|
| 2004/0227425 A1 | 11/2004 | Murray | |
| 2008/0157613 A1 | 7/2008 | Scott et al. | |
| 2008/0296903 A1 | 12/2008 | Todorof | |
| 2009/0096309 A1* | 4/2009 | Pabst | H02K 1/2773 29/596 |
| 2009/0218900 A1* | 9/2009 | Dickes | H02K 1/30 310/156.12 |
| 2012/0032547 A1* | 2/2012 | Bodenstein | H02K 1/2791 310/156.12 |
| 2014/0132004 A1 | 5/2014 | Casais et al. | |
| 2015/0026966 A1* | 1/2015 | Fang | H02K 15/03 29/598 |
| 2015/0256039 A1* | 9/2015 | Kristensen | F03D 9/25 290/55 |

FOREIGN PATENT DOCUMENTS

| | | |
|---|---|---|
| CN | 104979981 A | 10/2015 |
| CN | 207098919 U | 3/2018 |
| EP | 2066005 A2 | 6/2009 |
| EP | 2604855 A1 | 6/2013 |
| EP | 2713478 A1 | 4/2014 |
| EP | 3226383 A1 | 10/2017 |
| ES | 2233146 A1 | 6/2005 |
| ES | 2393617 T3 | 12/2012 |
| JP | 2001095214 A | 4/2001 |
| JP | 2002-262496 A | 9/2002 |
| JP | 2009-268164 A | 11/2009 |
| JP | 2013-013295 A | 1/2013 |
| JP | 2017-518728 A | 7/2017 |
| KR | 20170099711 A | 9/2017 |

OTHER PUBLICATIONS

Danish Patent and Trademark Office, Search and Examination Report in PA 2019 70067, Aug. 30, 2019.
European Patent Office, International Search Report and Written Opinion in PCT Application No. PCT/DK2020/050005, Mar. 31, 2021.
European Patent Office, examination report issued in corresponding EP Application No. 20700544.8, dated Aug. 8, 2023.
Japanese Patent Office, Office Action issued in corresponding JP Application No. 2021-540258, dated Aug. 29, 2023, with English translation.
China National Intellectual Property Administration, Office Action issued in corresponding CN Application No. 2020/0014215.2, dated Jan. 23, 2024.
Japanese Patent Office, Office Action issued in corresponding Japanese Application No. 2021-540258, dated Dec. 8, 2023.

* cited by examiner

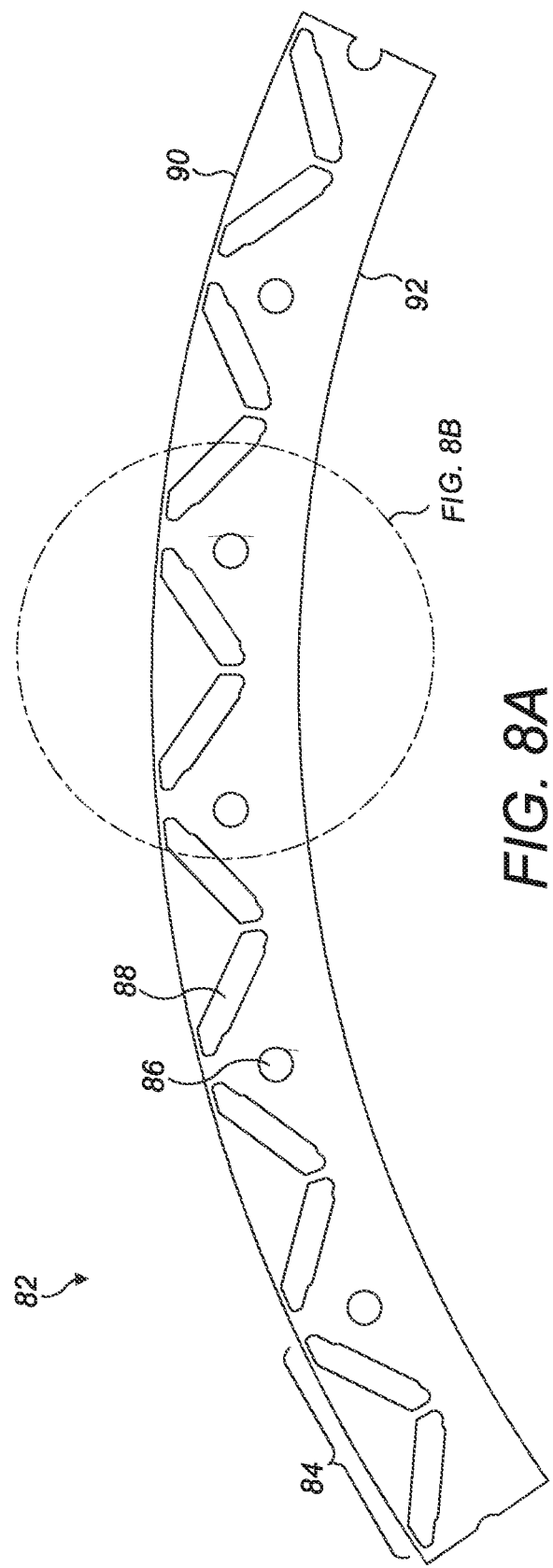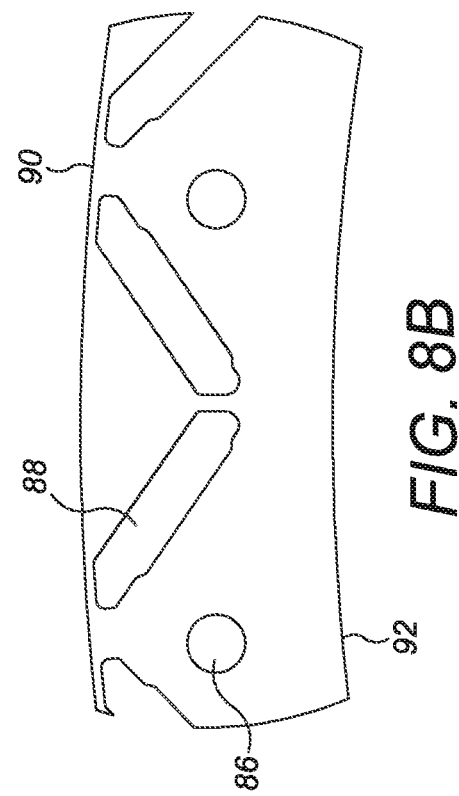

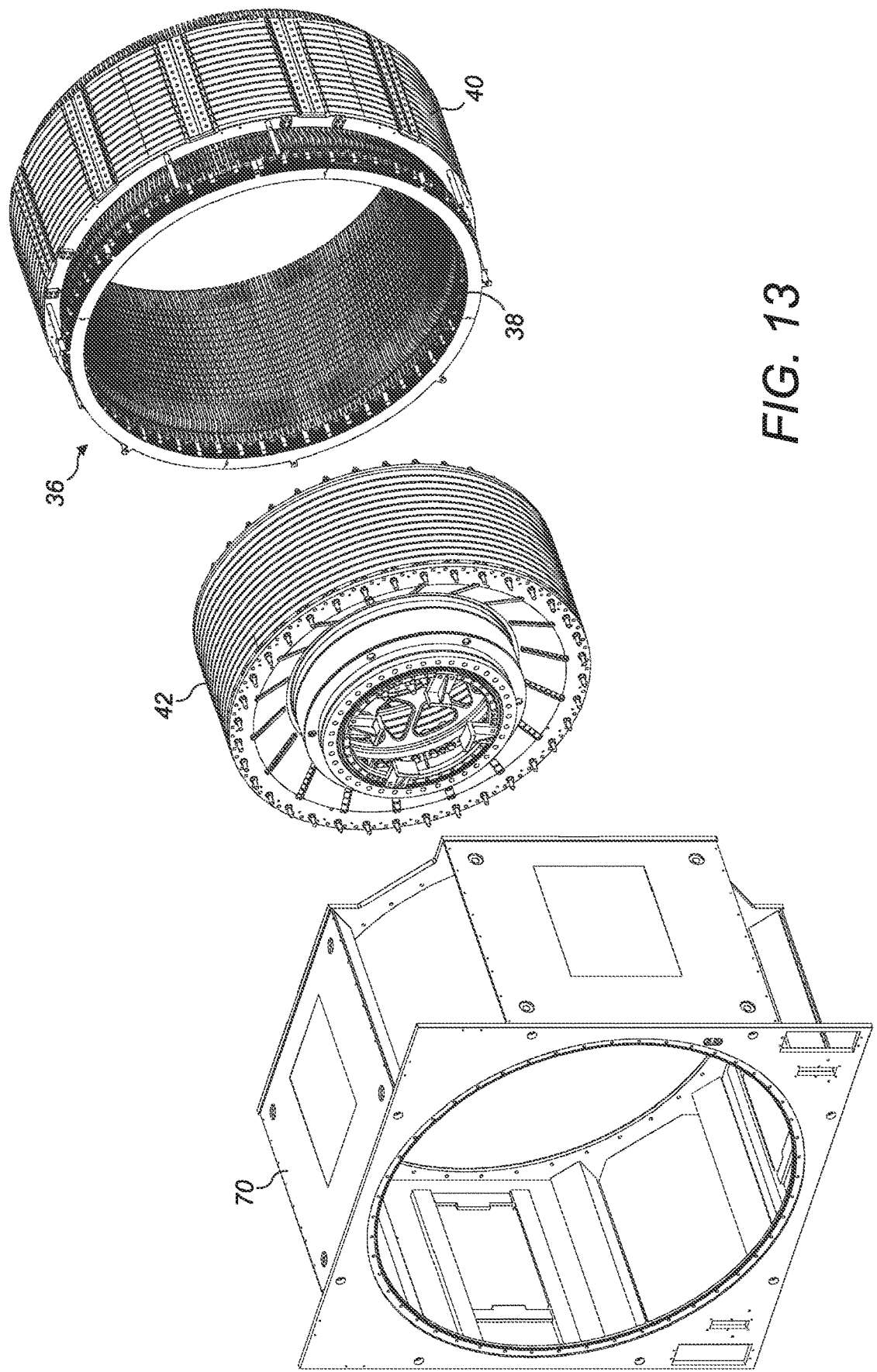

GENERATOR ROTOR ASSEMBLY

FIELD OF THE INVENTION

The present invention relates to a generator rotor assembly. More specifically, the present invention relates to a generator rotor assembly for a wind turbine.

BACKGROUND OF THE INVENTION

Wind turbines convert kinetic energy from the wind into electrical energy, using a large rotor with a number of rotor blades. A typical Horizontal Axis Wind Turbine (HAWT) comprises a tower, a nacelle on top of the tower, a rotor hub mounted to the nacelle and a plurality of wind turbine rotor blades coupled to the rotor hub. Depending on the direction of the wind, the nacelle and rotor blades are turned and directed into an optimal direction by a yaw system for rotating the nacelle and a pitch system for rotating the blades.

The nacelle houses many functional components of the wind turbine, including for example a generator, gearbox, drive train and rotor brake assembly, as well as convertor equipment for converting the mechanical energy at the rotor into electrical energy for provision to the grid. The gearbox steps up the rotational speed of the low speed main shaft and drives a gearbox output shaft. The gearbox output shaft in turn drives the generator, which converts the rotation of the gearbox output shaft into electricity. The electricity generated by the generator may then be converted as required before being supplied to an appropriate consumer, for example an electrical grid distribution system. So-called "direct drive" wind turbines that do not use gearboxes are also known. In a direct drive wind turbine, the generator is directly driven by a shaft connected to the rotor.

Ordinarily, the generator of a wind turbine is an IPM (interior permanent magnet) electric machine composed of an external stator assembly which surrounds an internal rotor assembly. The IPM internal rotor assembly is typically composed of multiple annular permanent magnetic packages, supported on a central shaft. The gearbox output shaft interfaces with the central shaft of the rotor assembly.

Like in other electric machines, the permanent magnetic packages are typically made of a stack of ring-shaped metal layers with aligned holes for receiving the permanent magnets that create the required magnetic field. For large generators, such as generators in large wind turbines, manufacturing the permanent magnet packages presents difficulties as the rings are simply too large to be manufactured in one piece. It is known to assemble the metal layers from a number of smaller segment sheets, all provided on a central hub to form a ring-shaped layer. Although the segmented layers may not have the same strength and structural integrity as layers made of a single piece of layer metal, the central hub provides for more than enough structural support for the rotor to withstand all centrifugal and other forces that act upon the rotor during use.

Another technical consideration for the design of wind turbine generators is that the generator becomes less effective as it heats up during use. This also applies to other key components of the wind turbine, such as the gearbox. Wind turbine performance and lifetime is therefore reliant upon efficient cooling of the generator.

Air-cooling is a cost-effective method of providing cooling of the generator. However, a megawatt-scale generator within the confined space of the generator housing produces too much heat for currently air-cooling methods to cool the generator effectively. The lack of efficient cooling of the generator results in a temperature rise in and around the generator components such as the rotor assembly.

It is an object of the present invention to provide a solution to one or more of the problems mentioned above.

SUMMARY OF THE INVENTION

According to a first aspect of the invention, this object is achieved by providing a generator rotor assembly for a wind turbine, wherein the generator rotor assembly comprises a cylindrical ring structure defining a central hollow portion and arranged to rotate around a rotational axis. The cylindrical ring structure comprises a plurality of permanent magnet packages arranged coaxially around the rotational axis, the permanent magnet packages comprising a plurality of coaxially stacked ring-shaped segmented layers, a plurality of tie rod holes and a plurality of tie rods. The coaxially stacked ring-shaped segmented layers comprise a plurality of contiguous segment sheets arranged around the rotational axis to form the ring-shaped layer, the stacked layers being staggered such that segment breaks between two contiguous segment sheets in one of the layers are angularly offset with respect to segment breaks between two contiguous sheets in an adjacent layer. The tie rod holes extend axially through the layers of the permanent magnet packages, wherein the plurality of tie rod holes of adjacent permanent magnet packages are complementary in size and position, such that a plurality of tie rod bores is defined. The tie rods extend through respective ones of the plurality of tie rod bores.

The staggered configuration of the ring-shaped segmented layers leads to increased friction between the stacked layers of the permanent magnet packages. In addition thereto, axial tie-bolt preload forces add to the strength structural and structural integrity of the individual permanent magnet packages and the cylindrical ring structure as a whole. These advantages enable manufacturing large permanent magnet packages which have similar strength as solid rings and which can withstand centrifugal (and other) forces applied to it in a typical wind turbine generator. As a consequence, this allows large generator rotor assembly structures to be produced without needing to assemble the permanent magnet packages onto a central hub.

Not having a central hub in the rotor assembly results in a number of important benefits, such as reduced cost and weight and improved cooling airflow. Cooling air that is provided centrally to the generator can freely flow in axial and radial directions and effectively cool the rotor and any generator parts located in its direct vicinity. A further important advantage of the rotor structure according to the invention is the modular character of the rotor assembly. The technical specifications of the rotor assembly can easily be adapted to the required performance by selecting, e.g., the right number of permanent magnet packages and the number of layers per package.

In preferred embodiments, the generator rotor assembly is at least partially open at at least one of its end surfaces for allowing a cooling airflow to flow from an exterior of the generator rotor assembly into the central hollow portion. Cooling channels may be provided in between at least some of the plurality of permanent magnet packages in order to allow for a cooling airflow to flow from the central hollow portion, through the cooling channels towards an exterior of the generator rotor assembly.

Preferably, the generator rotor assembly further comprises a plurality of spacers arranged on the tie rods and between adjacent permanent magnet packages. Such spacers provide for air gaps between the subsequent permanent magnet packages, through which the cooling airflow can also reach the stator and any parts closer to the external housing of the generator.

In preferred embodiments, all segment sheets comprise a number of the tie rod holes, spaced apart over a tie rod separation angle, and an angular offset between two adjacent layers is a multiple of the tie rod separation angle. In order to ensure that the tie rods can extend through all the permanent magnet packages, it is important that the tie rod holes of adjacent layers are aligned, also when the layers are staggered and an angular offset between the layers is introduced. When all segment sheets have multiple tie rod holes, this allows for a higher number of different angular offsets that still allow for the necessary tie rod bores to be formed.

In an embodiment, the angular offset between any two adjacent layers in the permanent magnet packages is at least two tie rod separation angles. The larger distance between the segment breaks of adjacent layers, the larger the overlap of the respective segment sheets and the larger the friction between the two layers. The increased friction leads to improved strength and structural integrity for the magnet package as a whole.

In a special embodiment, for every layer in the permanent magnet package an angular offset with an adjacent layer is larger than an angular offset with the subsequent layer. The resulting zigzag arrangement further adds to the strength and structural integrity of the permanent magnet packages.

To further improve on these aspects, a number of layers between every two layers in the permanent magnet package that are not angularly offset with respect to each other may be equal to a total number of tie rod holes per segment sheet minus one. In such an embodiment, all available different angular offsets are in use.

An even more solid and strong permanent magnet package may be obtained by bonding the plurality of layers together, e.g. using an adhesive or bonding varnish such as backlack.

The cylindrical ring structure may further comprise a ring-shaped flange comprising a rotor connection portion that is securely attached to one of the end packages of the cylindrical ring structure. The flange further comprises a drive shaft connection portion that is configured for direct or indirect connection to a drive shaft. This flange enables connecting the hubless rotor to, e.g., an output shaft of the gearbox without impeding the flow of cooling air through the rotor centre and outwards to the permanent magnet packages and the stator.

The ring-shaped flange may be securely attached to the end package at the non-drive end of the rotor. The flange may be connected to the end package via the tie rods.

According to a further aspect of the invention, a wind turbine is provided comprising a generator with a generator rotor assembly as described above or below.

BRIEF DESCRIPTION OF THE DRAWINGS

The present invention will now be described, by way of example only, with reference to the attached drawings, in which:

FIG. 8A is a front view of a segment sheet of the ring-shaped layer shown in FIG. 7;

FIG. 8B is a front view of part of the segment sheet shown in FIG. 8A;

FIG. 13 is an exploded view of the generator housing, the generator rotor assembly, and the generator stator assembly, in accordance with an embodiment of the invention.

DETAILED DESCRIPTION

A specific embodiment of the present invention will now be described in which numerous features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
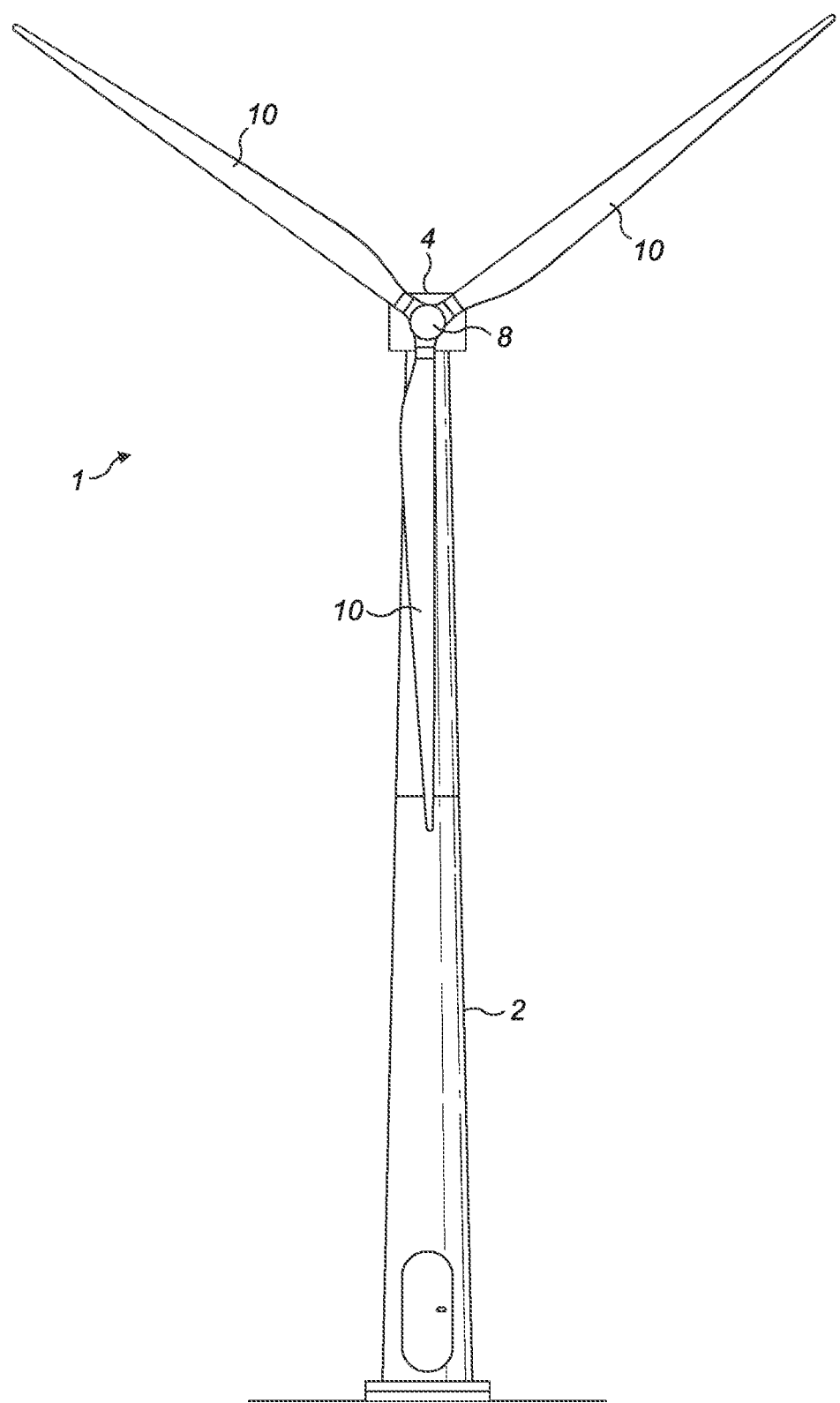
FIG. 1 is a front view schematic diagram showing a typical wind turbine.

In order to place the embodiments of the invention in a suitable context, reference will firstly be made to FIG. 1, which illustrates a typical Horizontal Axis Wind Turbine (HAWT) in which a generator rotor assembly according to an embodiment of the invention may be implemented. Although this particular image depicts an on-shore wind turbine, it will be understood that equivalent features will also be found on off-shore wind turbines. In addition, although the wind turbines are referred to as 'horizontal axis', it will be appreciated by the skilled person that for practical purposes, the axis is usually slightly inclined to prevent contact between the rotor blades and the wind turbine tower in the event of strong winds.

The wind turbine 1 comprises a tower 2, a nacelle 4 rotatably coupled to the top of the tower 2 by a yaw system, a rotor hub 8 mounted to the nacelle 4 and a plurality of wind turbine rotor blades 10 coupled to the rotor hub 8. The nacelle 4 and rotor blades 10 are turned and directed into the wind direction by the yaw system.

Figure 2:
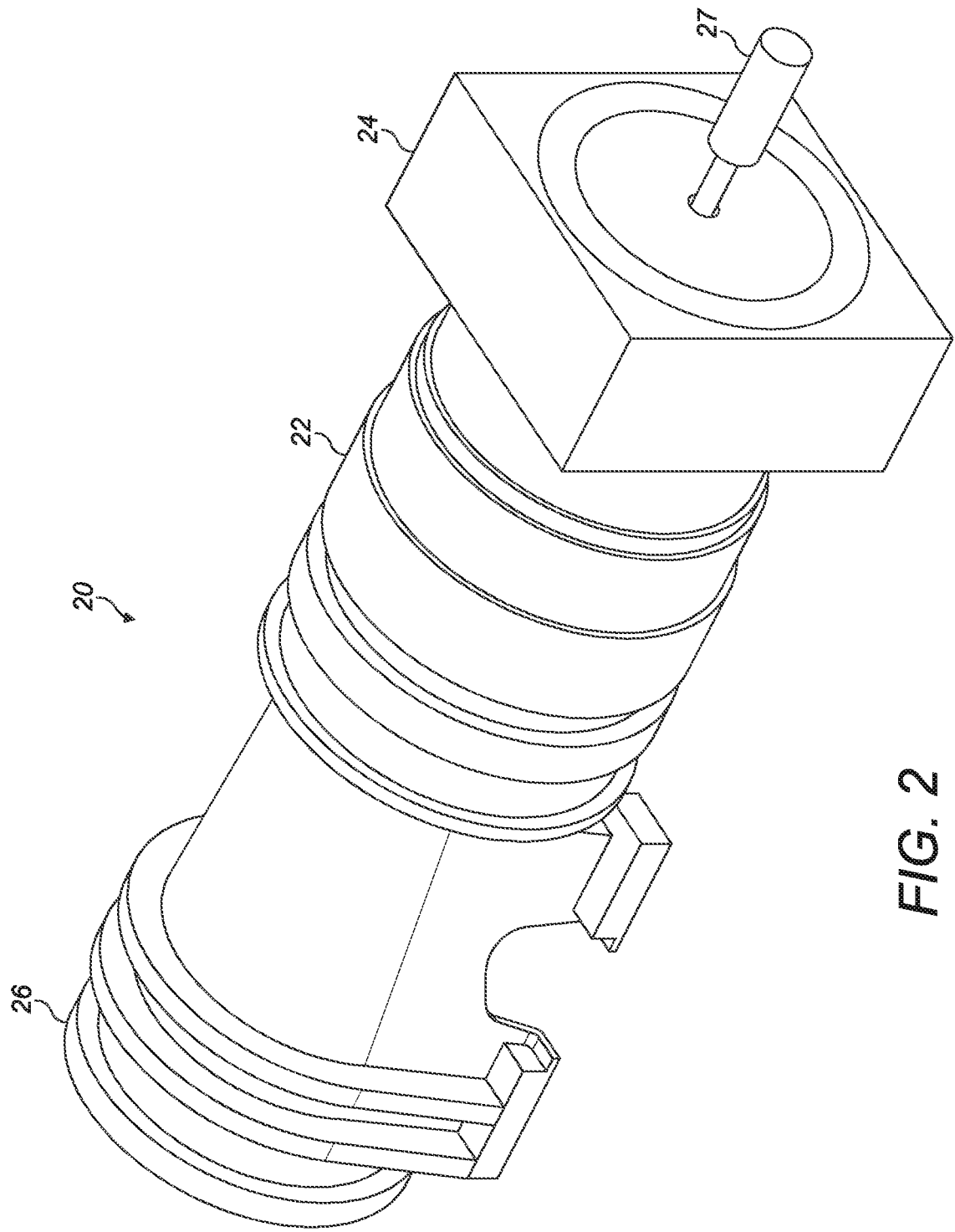
FIG. 2 is a schematic and perspective view of the main functional components housed within a nacelle of a typical wind turbine.

The nacelle 4 houses many functional components of the wind turbine, including the generator, gearbox, drive train and rotor brake assembly, as well as convertor equipment for converting the mechanical energy of the wind into electrical energy for provision to the grid. With reference to FIG. 2, the nacelle 4 may include a shaft housing 20, a gearbox 22 and a generator 24. A main shaft 26 extends through the shaft housing 20, and is supported on bearings (not shown). The main shaft 26 is connected to, and driven by, the rotor 8 and provides input drive to the gearbox 22. The gearbox 22 steps up the rotational speed of the low speed main shaft via internal gears (not shown) and drives a gearbox output shaft. The gearbox output shaft in turn drives the generator 24, which converts the rotation of the gearbox output shaft into electricity. The electricity generated by the generator 24 may then be converted by other components (not shown) as required before being supplied to an appropriate consumer, for example an electrical grid distribution system. So-called "direct drive" wind turbines that do not use gearboxes are also known. The gearbox may therefore be considered optional.

Figure 3:
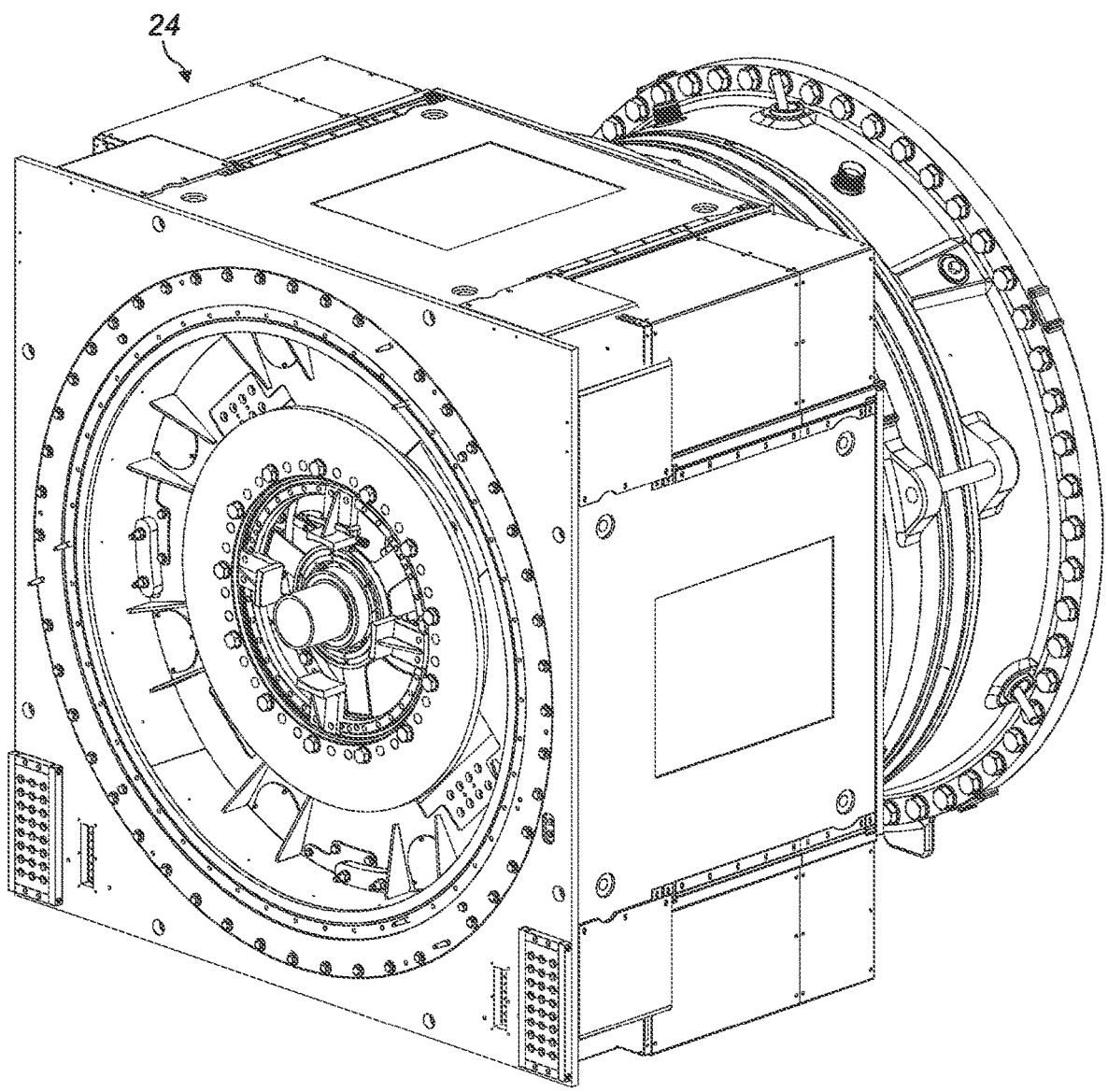
FIG. 3 is an isometric view of the generator of the nacelle of FIG. 2, coupled to a gearbox.

The gearbox 22 and generator 24 may be coupled together in an integrated unit. FIG. 3 shows the generator 24 in more detail. In FIG. 3, also the housing of the last stage of the gearbox 22 is shown as it is coupled to the housing of the generator 24.

With reference firstly to the gearbox 22, a gearbox housing is generally cylindrical in form and is oriented such that its major rotational axis is horizontal, in the orientation of the drawings. The cylindrical configuration of the gearbox housing is due to the specific type of gearbox that is used in the illustrated embodiment, which is an epicyclic gearbox. As the skilled person would know, an epicyclic gearbox comprises a series of planet gears that are arranged about a central sun gear, and which collectively are arranged within an encircling ring gear. The ratio of the number of teeth between the ring gear, the planet gear and the sun gears determines the gear ratio of the gearbox. For clarity, fine detail of the gearbox will not be described in further detail here as the gearbox is not the principal subject of the invention. Suffice to say that other gearbox configuration could also be used, although it is currently envisaged that an epicyclic gearbox provides an elegant solution fit for the confines of a wind turbine nacelle.

Figure 4:
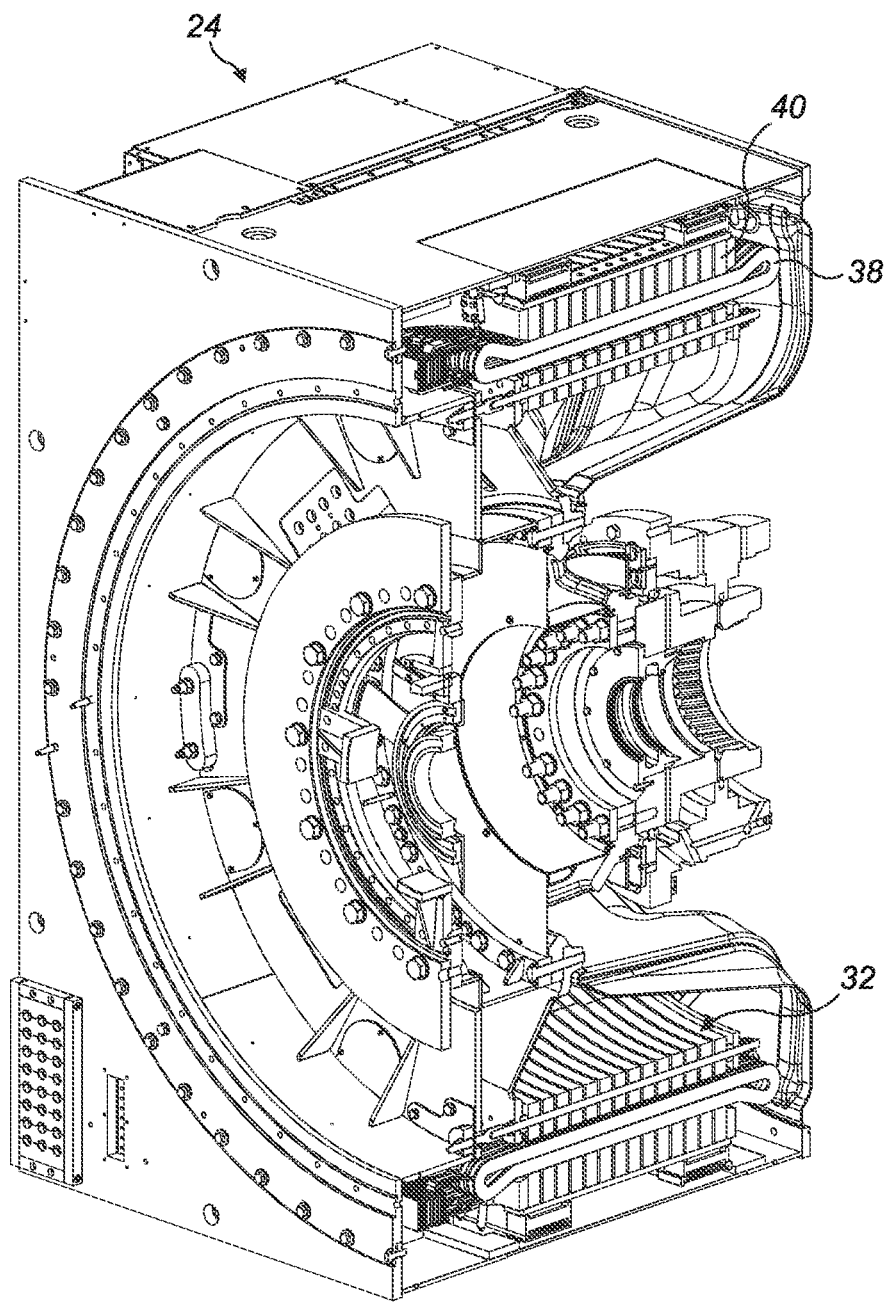
FIG. 4 is a cutaway view of the generator of FIG. 3.

The output shaft of the gearbox 22 interfaces with a rotor 32 of the generator 24. As such, the major axis of the gearbox output shaft defines the rotational axis of the generator 24. In FIG. 4, a cutaway view on the generator 24 only is provided. The generator 24 in the illustrated embodiment is an IPM (interior permanent magnet) electric machine having an external stator, which surrounds the rotor 32. The stator includes stator windings 38 a stator core 40 and a stator frame which surrounds and supports the stator windings 38 and stator core 40. It is however noted that the invention is not limited to a specific type of stator.

In accordance with an embodiment of the invention, there is provided a generator rotor assembly 42, forming part of the rotor 32 of the generator 24. Such a generator rotor assembly 42 is described below with reference to FIGS. 6 to 11. The generator rotor assembly 42 has a non-drive end, whereby the non-drive end faces away from the wind turbine driveline when the wind turbine is in use, and a drive end which faces toward the driveline when the turbine is in use. The non-drive end view of the generator rotor assembly 42 can be seen in FIG. 5, and the drive end view of the generator rotor assembly 42 can be seen in FIG. 6.

The generator rotor assembly 42 is made up of a cylindrical ring structure 46 defining a central hollow portion and arranged to rotate around a rotational axis. The cylindrical ring structure 46 comprises a plurality of permanent magnet packages 48. In the present embodiment, the permanent magnet packages 48 are all of equal circumference and thickness. In some embodiments, the thickness of the permanent magnet packages 48 may vary with respect to one another. For example, the rotor may comprise permanent magnet packages 48 of two different thicknesses, where the permanent magnet packages 48 of different thicknesses are arranged alternately. The permanent magnet packages 48 are arranged coaxially around the rotational axis, such that when assembled the arrangement of permanent magnet packages 48 defines a cylindrical structure with a central hollow portion. The permanent magnet packages 48 are spaced apart by an equal distance such that a gap is defined in between each pair of permanent magnet packages 48. These gaps allow air that is provided centrally to the generator to flow through the rotor structure and cool the generator rotor assembly as well as other parts of the generator, including parts that are located radially outside the rotor assembly 42. This airflow is further enhanced by the fact that no central hub is needed for providing structure and support for the rotor assembly 42.

Figure 5:
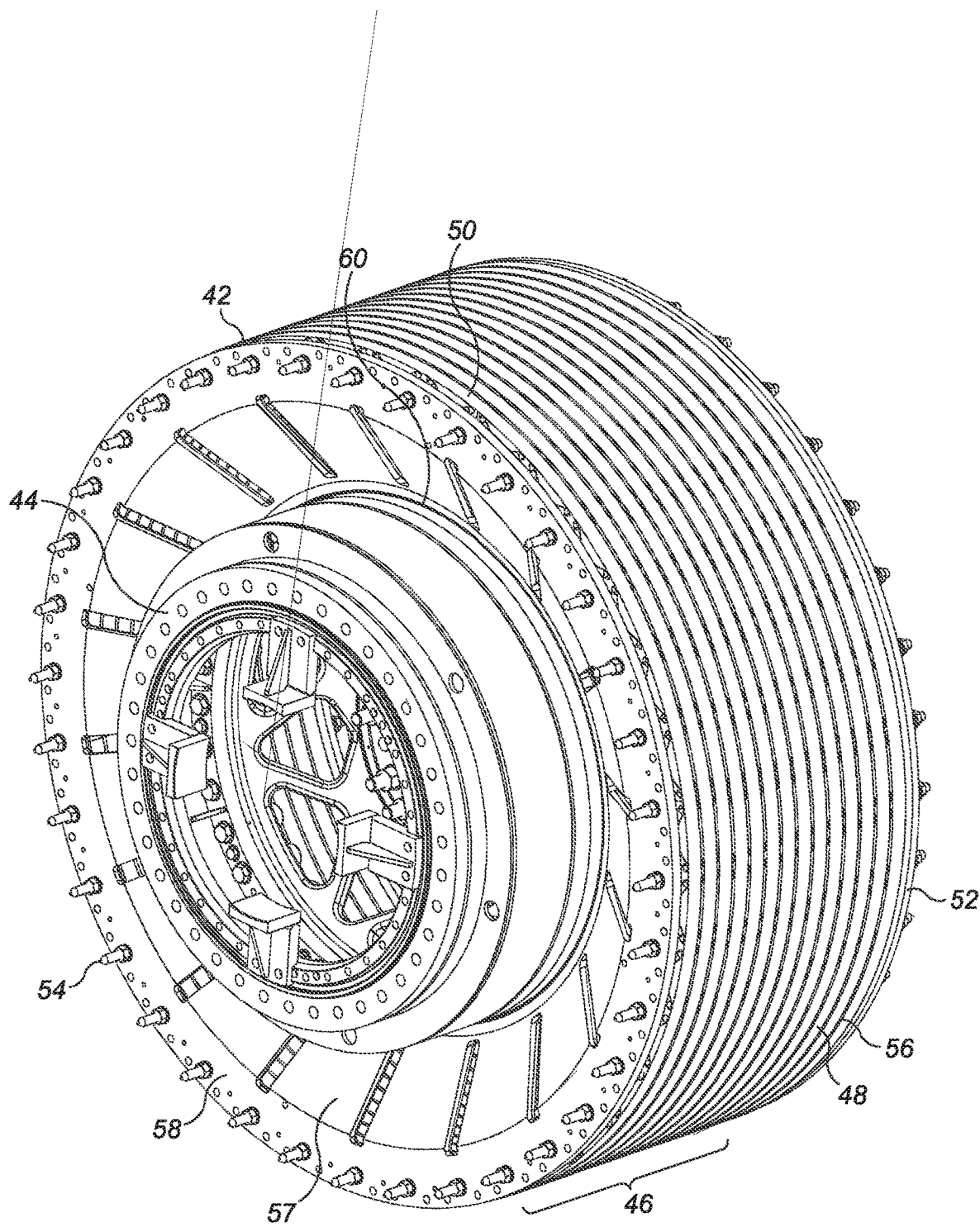
FIG. 5 is a non-drive end perspective view of a generator rotor, interfaced with a connector, in accordance with an embodiment of the invention.
Figure 6:
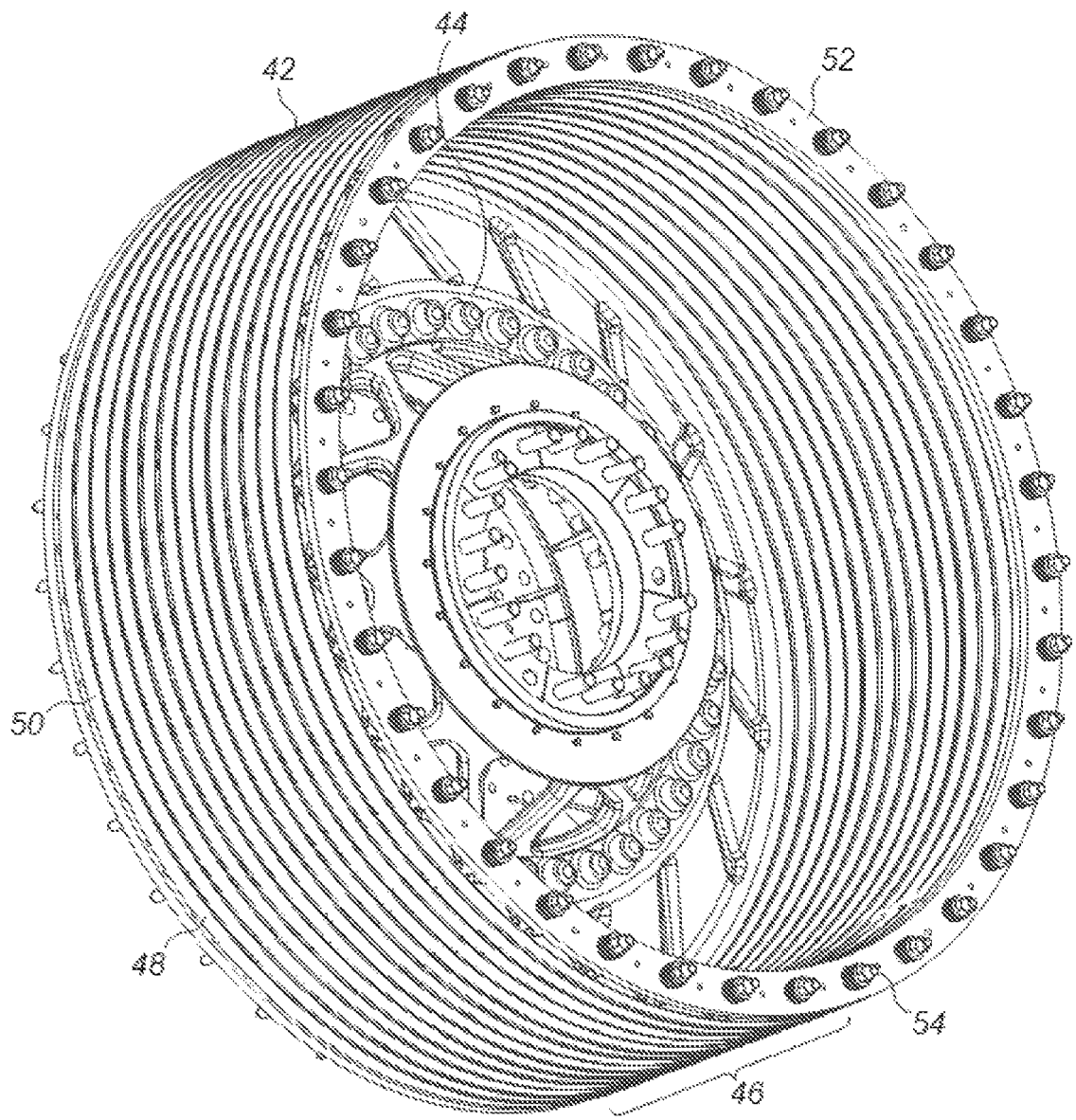
FIG. 6 is a drive end perspective view of the generator rotor assembly shown in FIG. 5.

The cylindrical ring structure 46 is defined by two end packages and a plurality of permanent magnet packages 48 provided therebetween. The two end packages comprise a first end package 50 and a second end package arranged at opposite ends of the cylindrical ring structure 46. Namely, as shown in FIG. 5, the first end package 50 is located at the non-drive end of the cylindrical ring structure 46, and the second end package is located at the drive end of the cylindrical ring structure 46.

It is noted that an end package 50 is generally just a normal permanent magnet package, just like any other permanent magnet package 48 in the cylindrical ring structure 46, with the sole exception that it is provided at an end of the cylindrical ring structure 46.

Alternatively, one or both of the end packages may have a greater thickness than the other permanent magnet packages 48. The end packages 50 may further comprise additional features for allowing connection of the cylindrical ring structure 46 to other parts of the generator or a coating that covers the outer surfaces of the cylindrical ring structure 46. An end ring 52 may be connected to one or both of the end packages 50, which end ring 52 may not comprise any permanent magnets itself.

The permanent magnet packages 48 comprise a plurality of tie rod holes which extend axially through the permanent magnet packages 48. The holes are located around the body of each of the permanent magnet packages 48. The holes are preferably spaced apart by an equal distance, i.e. angle. The holes of adjacent permanent magnet packages 48 are complementary in size and position, such that a plurality of tie rod bores is defined. The tie rod bores are arranged concentrically around the rotational axis. The tie rod bores extend through the packages 48 of the cylindrical ring structure 46 from the first end package 50 to the second end package, and possibly also through any additional end rings 52 or other structural elements that are directly connected to the cylindrical ring structure 46.

A plurality of tie rods 54 extend through respective ones of the plurality of tie rod bores. There is a plurality of spacers or washers 56 arranged on the tie rods 54 and between adjacent permanent magnet packages 48. Consequently, the tie rod bores are defined by a repeating pattern of inner surfaces of tie rod holes and washers 56. It is noted that, in other embodiments, no washers 56 may be used at all, thereby providing a single permanent magnet package rotor that is also supported by a plurality of rods 54.

Figure 7:
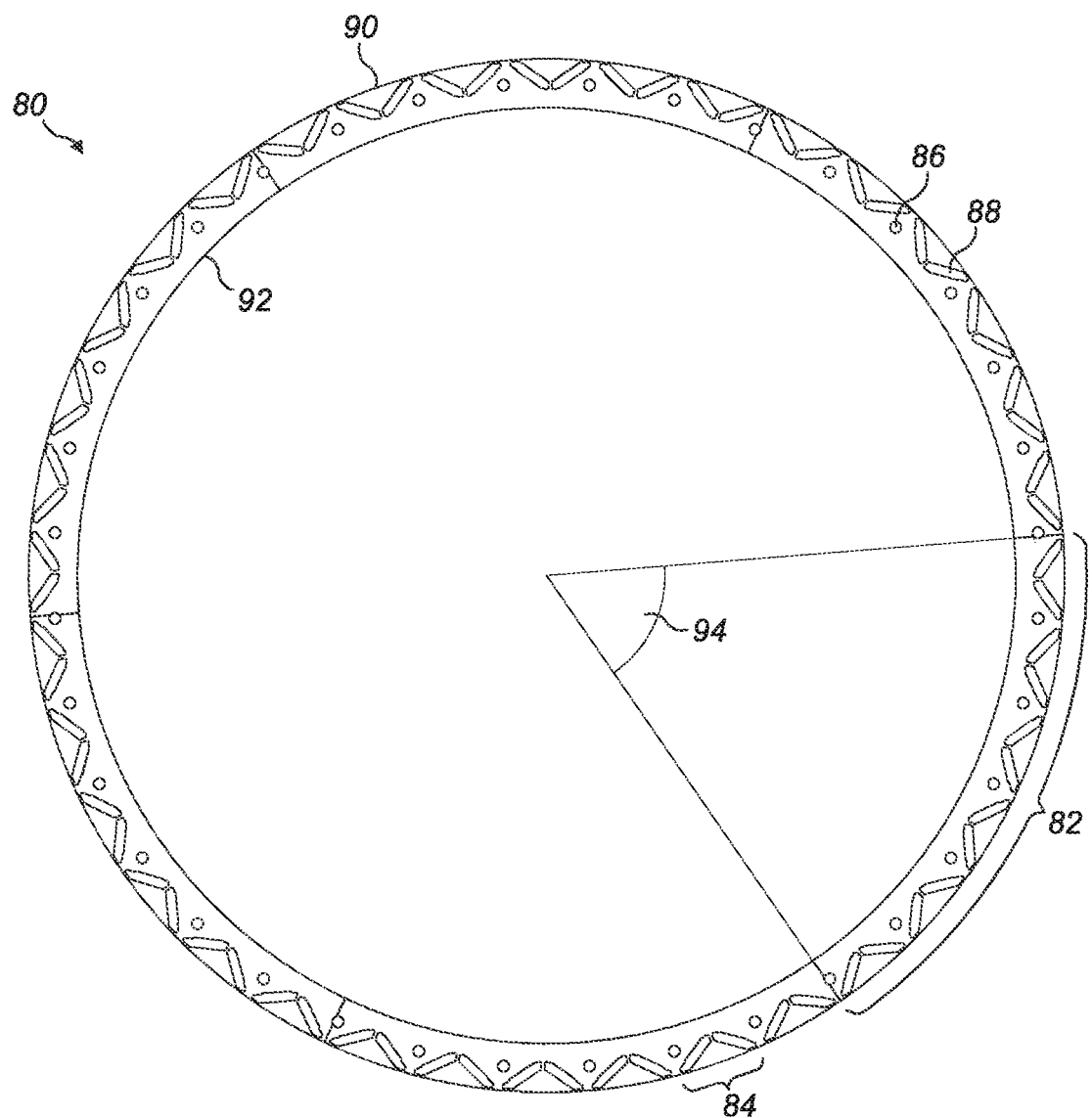
FIG. 7 is a front view of a ring-shaped layer which forms part of the generator rotor assembly shown in FIG. 5 and FIG. 6.
Figure 9:
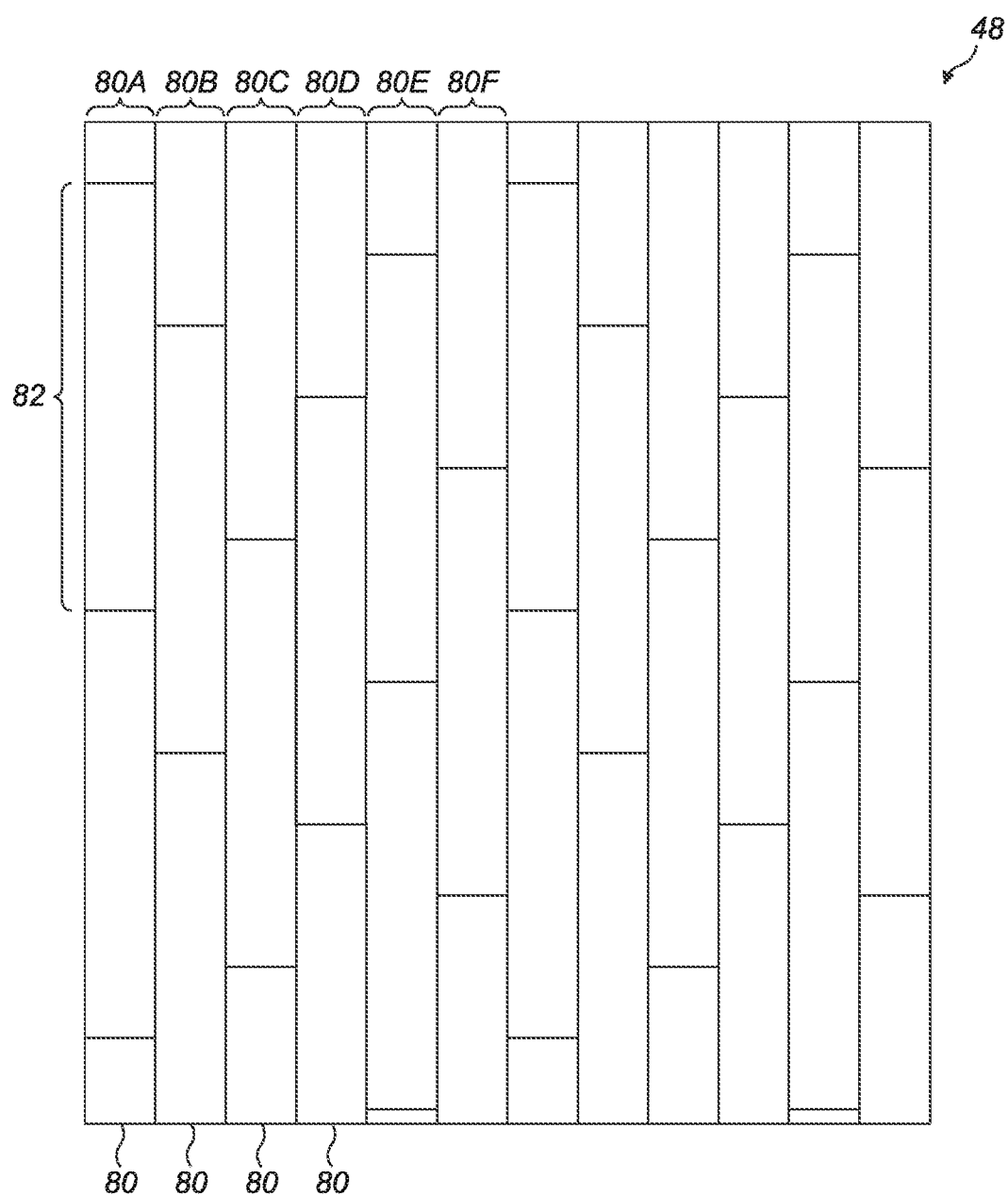
FIG. 9 is a side view schematic diagram of multiple ring-shaped layers stacked to form a permanent magnetic ring of the generator rotor assembly shown in FIG. 5 and FIG. 6.

The permanent magnet packages 48, an embodiment whereof is shown in FIGS. 7-9, comprise a plurality of coaxially stacked ring-shaped segmented layers 80, each comprising a plurality of contiguous segment sheets 82 arranged around the rotational axis to form the ring-shaped layer 80. The tie rod holes 86 extend axially through the layers of the permanent magnet packages 48, wherein the plurality of tie rod holes 86 of adjacent permanent magnet packages 48 are complementary in size and position, such that a plurality of tie rod bores is defined, and the tie rods 54 extend through respective ones of the plurality of tie rod bores.

A front view of a full ring-shaped layer 80 is shown in FIG. 7. Close-ups of the segment sheets 82 are shown in FIGS. 8A and 8B. The ring-shaped layer 80 comprises a plurality of segment sheets 82 arranged concentrically around the rotational axis. The ring-shaped layer 80 in this embodiment is made up of six segment sheets 82, but other numbers of segment sheets 82 may be used in other embodiments. Effectively, the permanent magnet packages 48 of the generator rotor assembly are formed of stacked layers 80, whereby each layer 80 is formed of a plurality of segment sheets 82 joined together at their segment edges to form a ring-shaped layer 80 with segment breaks. Preferably, all segment sheets 82 are identical and are dimensioned such that a whole number of segment sheets 82 makes up the 360 degrees of the complete ring-shaped layer 80.

A segment sheet 82, as shown in FIG. 8A, is an arc defined by an outer circumference 90, an inner circumference 92 and an apex angle 94 (see FIG. 7). The apex angle 94 is preferably equal to 360 degrees divided by the number of segment sheets 82 per layer 80, such that all the segment sheets 82 used can be identical. A segment sheet 82 comprises two segment edges arranged at opposite ends of the segment sheet 82 and connecting the outer circumference 90 to the inner circumference 92. The two segment edges are contiguous with the edges of adjacent segment sheets 82.

The segment sheets 82 shown in FIG. 7, comprises six magnet pairs 84 and an equal number of tie rod holes 86. Together, six contiguous segment sheets 82 form a ring-shaped layer 80 with six segment breaks, 36 magnetic poles and 36 tie rod holes 86. Here, magnetic poles are created by pairs of permanent magnets provided in magnet holes 88. In this example, each segment sheet 82 has six tie rod holes 86 and provides for six magnetic North poles and six magnetic South poles. In alternative embodiments, the number of tie rod holes 86 per segment sheet 82 may differ from the amount of magnet pairs, which will lead to a different amount of tie rod holes 86 and/or magnet holes 88 per segment sheet 82. Also the number of permanent magnets that is used for providing a magnetic pole may vary. Preferably, the number of magnetic holes 88 is a multiple of the number of tie rod holes 86.

In the embodiment shown here, the positions of the tie rod holes 86 in the segment sheets 82 are such that partial tie rod holes 86 are arranged at the segment edges. When assembled into a full ring-shaped layer 80, the partial tie rod holes 86 at each side of the segment breaks together form a full tie rod hole 86. Alternative arrangements may result in segment sheets 82 with full tie rod holes 86 only. For example, the segment breaks may be provided in between the two magnet holes 88 of a magnet pair or even halfway one of the magnet holes 88.

The ring-shaped layers 80, formed of the segment sheets 82, are stacked coaxially to form a permanent magnet package 48, as shown in FIG. 9. The layers 80 are stacked such that the segment sheets 82 of adjacent layers 80A-80F are angularly offset with respect to each other. As shown in FIG. 9, this results in a staggering of layers 80 of the permanent magnet package 48.

In order to allow for the forming of the tie rod bores through the permanent magnet packages 48, the angular offset of two adjacent layers 80 needs to be equal to or a multiple of the tie rod separation angle, i.e. the angular distance between two adjacent tie rod holes 86. In a symmetric setup, the tie rod separation angle is equal to 360 divided by the total amount of tie rods used in the cylindrical ring structure 46, i.e. the segment sheet apex angle 94 divided by the number of tie rod holes 86 per segment sheet. In this example, with every segment sheet 82 comprising six tie rod holes 86, five different angular offsets with respect to a first layer 80A are possible (i.e. six different possible orientations per layer 80A-80F).

According to the preferred embodiment shown in FIG. 9, the angular offset of any two adjacent layers 80A-80F in the permanent magnet packages 48 is at least twice the tie rod separation angle. Compared to offsets that would only correspond to tie rod separation angle, this arrangement provides for added friction between adjacent layers 80 and improved strength and structural integrity for the magnet package 48 as a whole. Starting from the left hand side, the angular offset of the second layer 80B with respect to the first layer 80A is two tie rod separation angles. The angular offset of the third layer 80C with respect to the first layer 80A is five tie rod separation angles. The angular offset of the fourth layer 80D with respect to the first layer 80A is three tie rod separation angles. The angular offset of the fifth layer 80E with respect to the first layer 80A is one tie rod separation angle. The angular offset of the sixth layer 80F with respect to the first layer 80A is four tie rod separation angles. This translates in a layer-to-layer offset between the six consecutive layers 80A-80F of two, three, two, two and three tie rod separation angles, while still using all six available orientations. After six layers 80A-80F, the same pattern may be repeated until the package 48 is completed. Consequently, there will always be five layers 80 in between two layers with equal orientation, thereby again increasing the strength and structural integrity for the magnet package 48 as a whole. More generally, the number of layers between every two layers in the permanent magnet packages 48 that are not angularly offset with respect to each other equals the total number of tie rod holes 86 per segment sheet 82 minus one.

For further added friction between the layers 80A-80F and improved strength and structural integrity of the whole permanent magnet package 48, every offset in one direction is followed by an offset in the other direction. In other words, for every layer 80A-80F in the permanent magnet package 48, an angular offset with an adjacent layer 80A-80F is larger than an angular offset with the subsequent layer 80A-80F. Adding directions to the already listed layer-to-layer offset (measured in tie rod separation angles) between the six consecutive layers 80A-80F is {+2, +3, −2, −2, +3, +2}, whereby +3 and −3 leads to the same offset in a symmetric setup with six tie rod holes 86 per layer 80. This zigzag arrangement provides for a much stronger friction bond between the different layers 80 of the permanent magnet package 48 than when all offsets would be in the same direction.

In the present embodiments, the number of available angular orientations (six, equal to the number of tie rod holes 86) is lower than the number of layers in the permanent magnet package (twelve). Consequently, the angular offset between adjacent layers 80 can be different up to the sixth layer. Starting from the seventh layer, the pattern of rotation is repeated for the remaining layers 80 of the permanent magnet package 48. It is noted that the permanent magnet package 48 may comprise any number of layers 80, which number is not necessarily a multiple of the number of tie rod holes 86 per segment sheet 82. Alternatively, in a thinner permanent magnet package 48, when using thicker layers 80 or when using larger segment sheets 82 with more tie rod holes 86 per segment sheet, the total number of possible orientations may be equal to (or even lower than) the number of layers 80 in the permanent magnet package 48. In this case, all layers 80 in the permanent magnet package 48 can be angularly offset with respect to each other.

The increased friction force between the ring-shaped layers 80 caused by staggering and further increased by the special staggering patterns results in the stack of layers 80 having a strength and structural integrity similar to that of a single solid ring of the same dimensions. For further improve structural integrity, the stacked ring-shaped layers 80 may be bonded together by an adhesive or bonding varnish such as backlack.

This staggered configuration enables manufacture of large permanent magnet packages 48 which have similar strength as solid rings and which can withstand centrifugal (and other) forces applied to it in a typical wind turbine generator. Therefore, it allows large generator rotor assembly structures, whereby manufacturing generator rotor assemblies from solid rings is not feasible, to be produced without needing to assemble the permanent magnet packages 48 onto a central hub. Not having a central hub in the rotor assembly results in a number of important benefits, such as reduced cost and weight and improved cooling airflow. The absence of a central hub means that air that is provided centrally to the generator is allowed to flow freely in axial and radial directions and cool the generator rotor assembly 42 and other parts of the generator that are located in its direct vicinity. In combination with the staggered arrangement of segmented ring-shaped layers 80, the tie rods 54 and washers 56 may serve as shear pins which further prevent the layers from slipping relative to one another.

The rods 54 and the permanent magnet packages 48, preferably together with the washers 56 provide for the main structure of the rotor. In order to allow the hubless rotor to be connected to a drive shaft, e.g. the output shaft of the gearbox, the cylindrical ring structure 46 comprises a ring-shaped flange 57, as can be seen in FIG. 5, which is securely attached to the first end package 50 which is at the non-drive end. In some embodiments, the ring-shaped flange may be securely attached to the second end package which is at the drive end. An end ring 52 may be provided in between the end package and the ring-shaped flange 57.

The ring-shaped flange 57 comprises a rotor connection portion 58 that is securely attached to the first end package 50, and a drive shaft connection portion 60, configured for indirect connection to the gearbox output shaft, which is also known as the drive shaft. The generator rotor assembly 42 is interfaced with a connector 44 (see FIG. 5) for further parts, for example a brake disc.

The rotor connection portion 58 of the ring-shaped flange 57 is attached to the first end package 50 using the tie rods 54 which hold the permanent magnetic packages 48 together to form the cylindrical ring structure 46. The circumference of the rotor connection portion 58 of the ring-shaped flange 57 is substantially equal to the circumference of the first end package 50. The rotor connection portion 58 comprises a plurality of holes which extend axially through the rotor connection portion 58. The plurality of holes of the rotor connection portion 58 are arranged for receiving the plurality of tie rods 54 and attaching the ring-shaped flange 57 to the first end package 50. The rotor connection portion 58 is attached parallel to and in direct contact with the first end package 50. This can be seen particularly clearly in the part cutaway view and the side cross-section view of the generator rotor assembly shown FIGS. 10 and 11, respectively.

Figure 10:
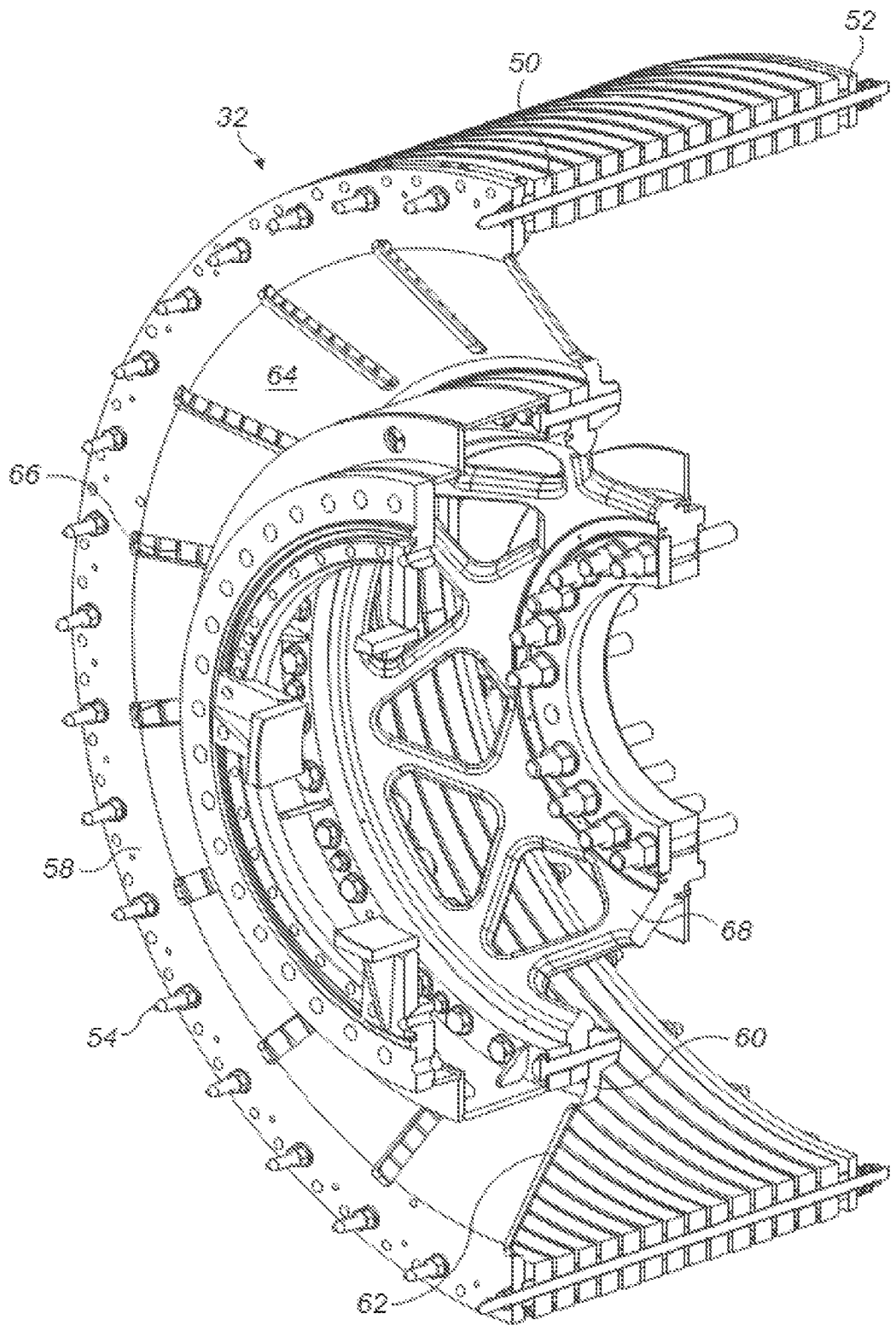
FIG. 10 is a part cutaway view of the generator rotor assembly shown in FIGS. 5 and 6.
Figure 11:
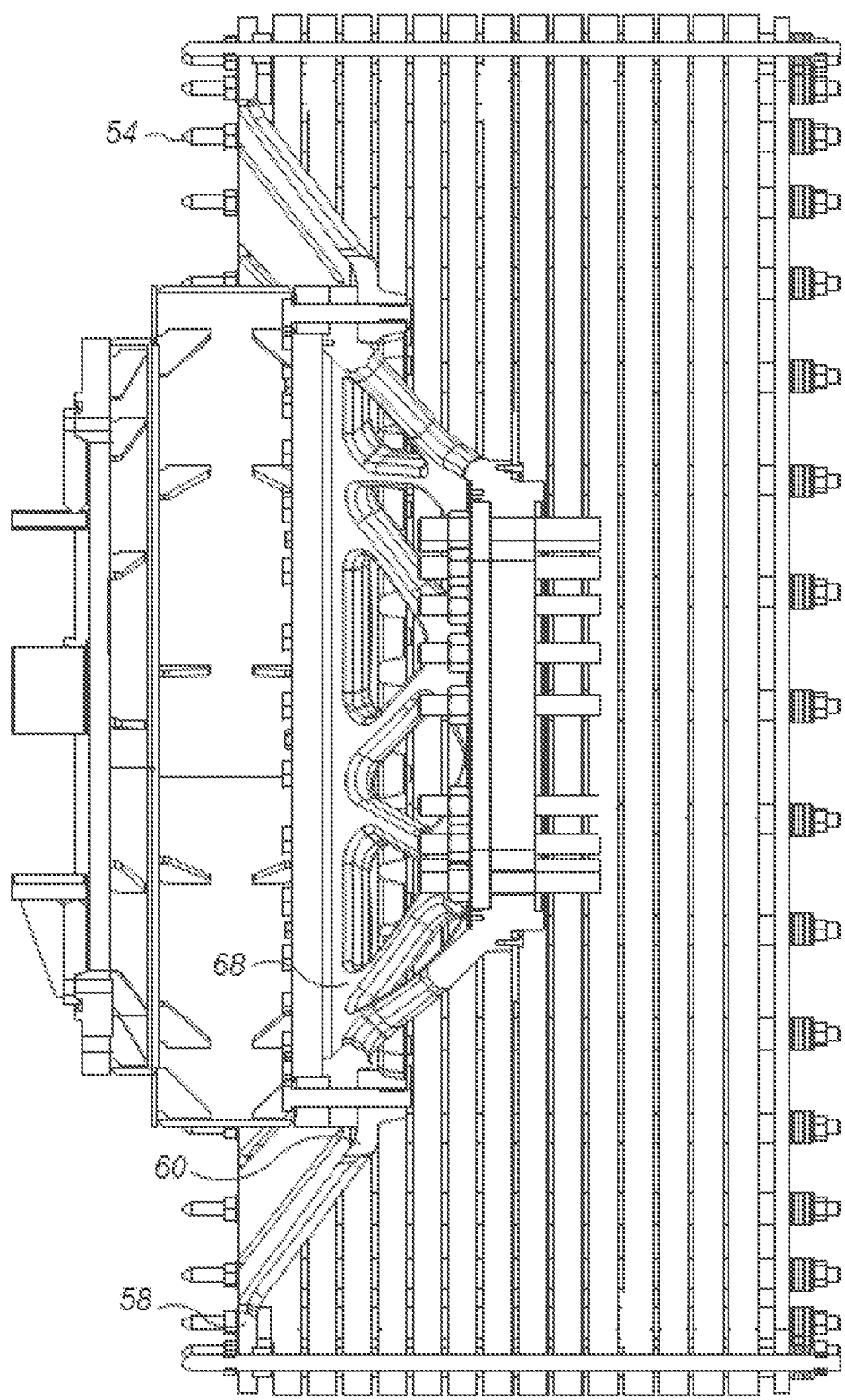
FIG. 11 is a side cross-sectional view of the generator rotor assembly shown in FIGS. 5, 6 and 10.

The drive shaft connection portion 60 of the ring-shaped flange 57, which can be seen clearly in FIG. 10 and FIG. 11, extends in a plane that is parallel to the rotor connection portion 58. The circumference of the drive shaft connection portion 60 is smaller than the circumference of the rotor connection portion 58. The drive shaft connection portion 60 comprises a ring-shaped element. In addition, the drive shaft connection portion 60 is located within the central hollow portion defined by the cylindrical ring structure 46.

The ring-shaped flange 57 may be just a single ring of which a radially outer portion forms the rotor connection portion 58 and a radially inner portion the drive shaft connection portion 60. Alternatively, the ring-shaped flange 57 may further comprise an intermediary portion 62 (see FIG. 10) connecting the rotor connection portion 58 to the drive shaft connection portion 60. This intermediary portion 62 may be angled relative to the two connection portions 58, 60, such that the ring-shaped flange 57 partially projects into the hollow portion of the generator rotor assembly 42. In the embodiment of FIG. 10, the angle between the intermediary portion 62 and the rotor connection portion 58 around their common point (the vertex) is approximately 135 degrees. The angle between the intermediary portion 62 and the drive shaft connection portion 60 around their common point is approximately 135 degrees.

The intermediary portion 62 comprises a plurality of bridge portions 64 arranged at predetermined intervals along the rotor connection portion 58 and concentrically around the rotational axis, such that bridge gaps 66 are defined between adjacent bridge portions 64. The bridge gaps 66 allow for cooling airflow passing through the ring-shaped flange 57 and into the internal structure of the generator.

The ring-shaped flange 57 also has a drive shaft connection frame 68 joined to the drive shaft connection portion 60. The drive shaft connection frame 68 extends into the central hollow portion. In this example, the connection frame 68 has a frustoconical shape with an outer surface that may be approximately parallel to the intermediary portion 62 of the ring shaped flange 57. The outer surface preferably comprises openings for allowing a cooling airflow to flow through and reach the internal structure of the generator. The drive shaft connection frame 68 is configured to connect the ring-shaped flange 57 to the drive shaft. The ring-shaped flange 57 and the drive shaft connection frame 68 provide a stable and space saving structure for joining the cylindrical ring structure 46 of the generator rotor assembly 42 to the drive shaft.

Figure 12:
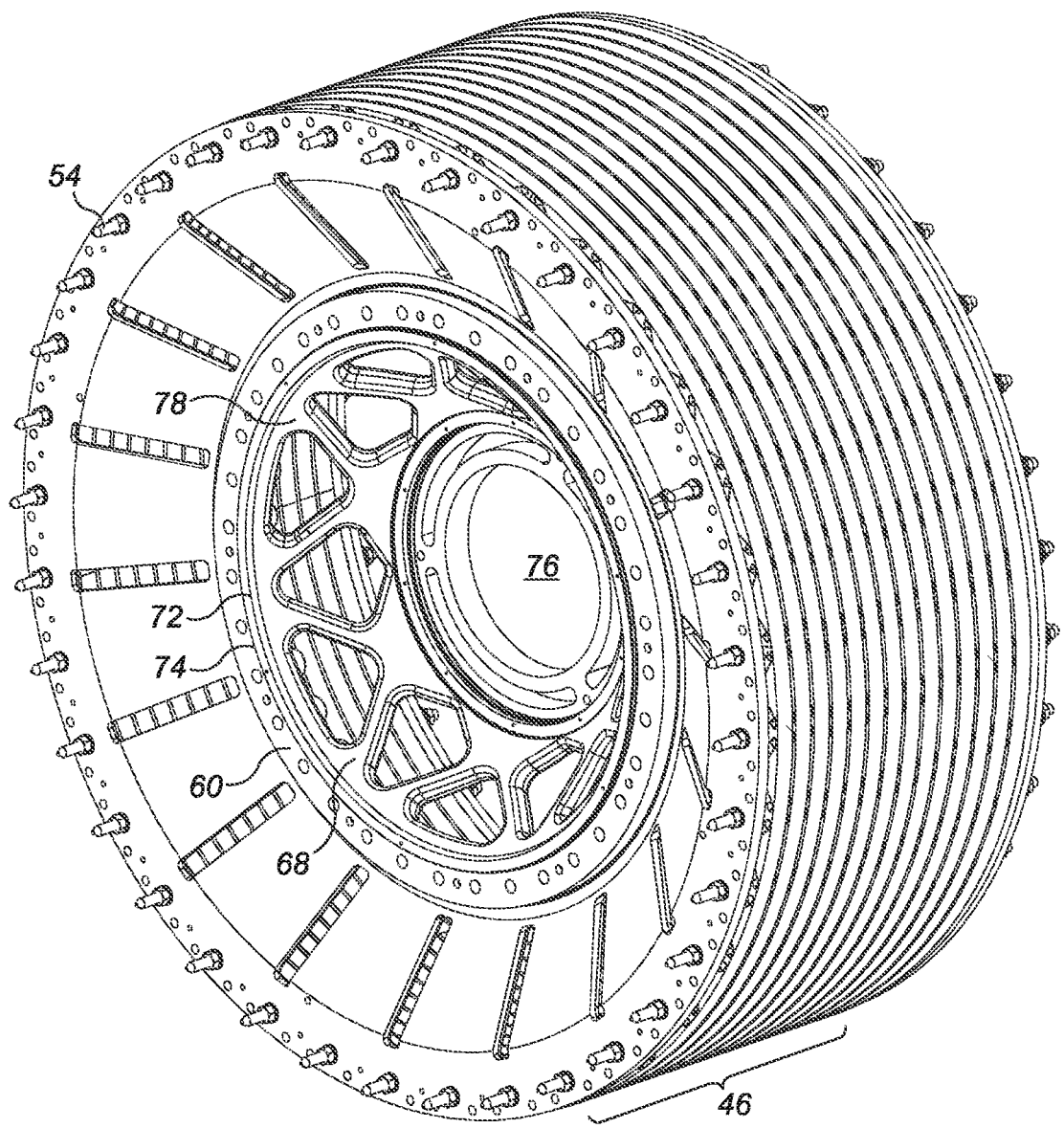
FIG. 12 is a non-drive end perspective view of the generator rotor assembly of FIG. 5, with the connector removed.

The drive shaft connection frame 68 can be seen more clearly in FIG. 12, which is a non-drive end perspective view of the generator rotor assembly of FIG. 5, with the connector 44 removed. The drive shaft connection frame 68 has a generally frustro-conical shape whereby the circular outer edge 72 of the base of the frame 68 is joined to the circular outer edge 74 of the drive shaft connection portion 60. The frame 68 extends from the drive shaft connection portion 60 into the hollow portion defined by the cylindrical ring structure 46. The frame 68 comprises a circular channel 76 arranged to rotate around the rotational axis with the cylindrical ring structure 46 of the generator rotor assembly 42. The circular channel 76 is for receiving the gearbox output shaft. The frame 68 also comprises a perforated wall 78 which extends from the circular outer edge 72 of the base of the frame 68 to the circular channel 76. The perforations in the perforated wall 78 facilitate airflow through the generator rotor assembly.

The permanent magnet packages 48 in the generator rotor assembly are connectable in a modular structure to alter the number of permanent magnetic rings comprised within the cylindrical ring structure. The structure of the generator rotor assembly of the present invention therefore enables a modular approach wherein rotors of any desirable number and type of permanent magnet packages 48 can be used.

When the generator is assembled, the generator rotor assembly 42 is surrounded by the external stator assembly 36, whereby the external stator assembly 36 includes the stator core 40 and the stator frame which surrounds and supports the stator core 40. Both the generator rotor assembly 42 and the generator stator assembly 36 are surrounded by a generator housing 70, which can be seen in the exploded view of the generator housing 70, the generator rotor assembly 42, and the generator stator assembly 36 in FIG. 13.

The generator rotor assembly 42 and the connection to the drive shaft allow for a cooling airflow through the central hollow portion, which is defined by the cylindrical ring structure 46, and between the adjacent permanent magnet packages 48.

Many modifications may be made to the specific examples described above without departing from the scope of the invention as defined in the accompanying claims. Features of one embodiment may also be used in other embodiments, either as an addition to such embodiment or as a replacement thereof.

For example, some of the permanent magnet packages 48 in the cylindrical ring structure 46 may have a different circumference to others within the cylindrical ring structure 46. Some of the permanent magnet packages 48 in the cylindrical ring structure 46 may have a different thickness to others within the cylindrical ring structure 46.

For example, the cylindrical ring structure 46 of the generator rotor assembly may comprise a ring-shaped flange with a rotor connection portion that is securely attached to the second end ring, which is at the drive end of the rotor assembly. The drive shaft connection portion may be configured for direct connection to the drive shaft.

The ring-shaped flange may be attached to either one of the end packages by other means than the tie rods 54 that are used for that purpose in the embodiment described above.

The drive shaft connection portion may extend in a plane coinciding with, rather than simply parallel to, the rotor connection portion.

The intermediary portion, which is defined between the rotor connection portion and the drive shaft connection portion, may be at an angle of 90-180, preferably 105-165, and even more preferably 120-150 degrees with respect to the rotor connection portion and a similar angle with respect to the drive shaft connection portion. When both angles are the same, but in different directions, the rotor connection portion and the drive shaft connection portion will be in parallel planes, which may be practical in view of connecting the gearbox output shaft to the rotor assembly. It is, however, noted that both angles are not necessarily equal and may differ where that would be desired.

The rotor connection portion may further comprise a plurality of clamps, clamping the rotor connection portion to the respective end ring. The rotor connection portion may be attached parallel to but not in direct contact with one of the end packages. For example, spacers may be placed between the end package and the rotor connection portion.

The invention claimed is:

1. A generator rotor assembly for a wind turbine, wherein the generator rotor assembly comprises a cylindrical ring structure defining a central hollow portion and arranged to rotate around a rotational axis, the cylindrical ring structure comprising:
a plurality of permanent magnet packages arranged coaxially around the rotational axis, each of the permanent magnet packages comprising:
a plurality of coaxially stacked ring-shaped segmented layers each comprising a plurality of contiguous segment sheets arranged around the rotational axis to form the ring-shaped segmented layer, the stacked ring-shaped segmented layers being staggered such that each segment break between two contiguous segment sheets in each of the ring shaped segmented layers is angularly offset with respect to each segment break between two contiguous segment sheets in each axially adjacent ring shaped segmented layer,
a plurality of tie rod holes which extend axially through the ring shaped segmented layers of the permanent magnet packages, wherein the plurality of tie rod holes of adjacent permanent magnet packages are complementary in size and position, such that a plurality of tie rod bores is defined, and
a plurality of tie rods extending through respective ones of the plurality of tie rod bores.

2. The generator rotor assembly of claim 1, wherein each segment sheet comprises a number of the tie rod holes spaced apart over a tie rod separation angle, and wherein an angular offset between two adjacent ring-shaped segmented layers is a multiple of the tie rod separation angle.

3. The generator rotor assembly of claim 2, wherein the angular offset between any two adjacent ring-shaped segmented layers in the permanent magnet packages is at least two tie rod separation angles.

4. The generator rotor assembly of claim 1, wherein for every ring-shaped segmented layer in the permanent magnet package an angular offset with an adjacent ring-shaped segmented layer is larger than the angular offset with the subsequent ring-shaped segmented layer.

5. The generator rotor assembly of claim 1, wherein a number of ring-shaped segmented layers between every two ring-shaped segmented layers in the permanent magnet package that are not angularly offset with respect to each other equals a total number of tie rod holes per segment sheet minus one.

6. The generator rotor assembly of claim 1, wherein a total number of tie rod holes per segment sheet is lower than or equal to a number of ring-shaped segmented layers in the permanent magnet package and wherein all ring-shaped segmented layers in the permanent magnet package are angularly offset with respect to each other.

7. The generator rotor assembly of claim 1, each segment sheet further comprising a number of magnet hole pairs for receiving interior permanent magnets and establishing a magnetic pole, the number of magnet hole pairs being equal to or a multiple of the number of tie rod holes.

8. The generator rotor assembly of claim 1, wherein the ring-shaped segmented layers of each permanent magnet package are bonded together.

9. The generator rotor assembly of claim 1, further comprising a plurality of spacers arranged on the tie rods and between adjacent permanent magnet packages.

10. The generator rotor assembly of claim 1, wherein the plurality of permanent magnet packages comprises two end packages arranged at opposite ends of the cylindrical ring structure, and the cylindrical ring structure further comprises a ring-shaped flange comprising a rotor connection portion that is securely attached to one of the end packages and a drive shaft connection portion configured for direct or indirect connection to a drive shaft.

11. The generator rotor assembly of claim 10, wherein the end packages are located at a drive end and at a non-drive end of the cylindrical ring structure, the non-drive end faces away from a wind turbine driveline when in use, and the ring-shaped flange is securely attached to the end package at the non-drive end.

12. The generator rotor assembly of claim 10, wherein the rotor connection portion comprises a plurality of tie rod holes which extend axially through the rotor connection portion, and the plurality of tie rod holes of the rotor connection portion are arranged for receiving the plurality of tie rods and attaching the ring-shaped flange thereto.

13. The generator rotor assembly of claim 10, wherein the rotor connection portion is attached parallel to and in direct contact with the end package.

14. The generator rotor assembly of claim 10, wherein the drive shaft connection portion extends in a plane coinciding with or parallel to the rotor connection portion.

15. The generator rotor assembly of claim 10, wherein the circumference of the drive shaft connection portion is smaller than the circumference of the rotor connection portion.

16. The generator rotor assembly of claim 10, wherein the ring shaped flange further comprises an intermediary portion connecting the rotor connection portion to the drive shaft connection portion, the intermediary portion being at an angle of 90-180 degrees with respect to the rotor connection portion and an angle of 90-180 degrees with respect to the drive shaft connection portion.

17. The generator rotor assembly of claim 16, wherein the intermediary portion comprises a plurality of bridge portions arranged at predetermined intervals along the rotor connection portion and concentrically around the rotational axis, such that bridge gaps are defined between adjacent bridge portions.

18. The generator rotor assembly of claim 10, wherein a circumference of the ring-shaped flange is substantially equal to a circumference of the end package.

19. The generator rotor assembly of claim 10, wherein the drive shaft connection portion comprises a ring-shaped element.

20. The generator rotor assembly of claim 10, wherein the ring-shaped flange further comprises a drive shaft connection frame joined to the drive shaft connection portion, the drive shaft connection frame extends into the central hollow portion, and the drive shaft connection frame is configured to connect the ring-shaped flange to the drive shaft.

21. The generator rotor assembly of claim 1, wherein the generator rotor assembly includes a drive end and a non-drive end, and is at least partially open at one or both of the drive end and the non-drive end for allowing a cooling airflow to flow from an exterior of the generator rotor assembly into the central hollow portion.

22. The generator rotor assembly of claim 1, further comprising cooling channels provided in between at least some of the plurality of permanent magnet packages in order to allow for a cooling airflow to flow from the central hollow portion, through the cooling channels towards an exterior of the generator rotor assembly.

23. The generator rotor assembly of claim 1, wherein each segment sheet comprises at least two magnet pairs.

24. The generator rotor assembly of claim 1, wherein each of the segment sheets is dimensioned such that less than 20 segment sheets make up the 360 degrees of a complete ring-shaped segmented layer.

25. The generator rotor assembly of claim 1, wherein said assembly is configured to be self-supported without support from a central hub.

26. A wind turbine comprising a generator with a generator rotor assembly according to claim 1.

27. A generator rotor assembly for a wind turbine, wherein the generator rotor assembly comprises a cylindrical ring structure defining a central hollow portion and arranged to rotate around a rotational axis, the cylindrical ring structure comprising:
a plurality of permanent magnet packages arranged coaxially around the rotational axis such that adjacent permanent magnet packages are axially spaced from each other to define an air gap between each pair of permanent magnet packages, each of the permanent magnet packages comprising:
a plurality of coaxially stacked ring-shaped segmented layers each comprising a plurality of contiguous segment sheets arranged around the rotational axis to form the ring-shaped segmented layer, the stacked ring-shaped segmented layers being staggered such that segment breaks between two contiguous segment sheets in one of the ring shaped segmented layers are angularly offset with respect to segment breaks between two contiguous segment sheets in an adjacent ring shaped segmented layer,
a plurality of tie rod holes which extend axially through the ring shaped segmented layers of the permanent magnet packages, wherein the plurality of tie rod holes of adjacent permanent magnet packages are complementary in size and position, such that a plurality of tie rod bores is defined, and
a plurality of tie rods extending through respective ones of the plurality of tie rod bores.

28. A generator rotor assembly for a wind turbine, wherein the generator rotor assembly comprises a cylindrical ring structure defining a central hollow portion and arranged to rotate around a rotational axis, the cylindrical ring structure comprising:
a plurality of permanent magnet packages arranged coaxially around the rotational axis, each of the permanent magnet packages comprising:
a plurality of coaxially stacked ring-shaped segmented layers each comprising a plurality of contiguous segment sheets arranged around the rotational axis to form the ring-shaped segmented layer, each segment sheet including an inner circumference, an outer circumference, and a first plurality of magnet holes positioned between the inner circumference and the outer circumference and configured to receive permanent magnets, the stacked ring-shaped segmented layers being staggered such that each segment break between two contiguous segment sheets in each of the ring shaped segmented layers is angularly offset with respect to each segment break between two contiguous segment sheets in each adjacent ring shaped segmented layer,
a plurality of tie rod holes which extend axially through the ring shaped segmented layers of the permanent magnet packages, wherein the plurality of tie rod holes of adjacent permanent magnet packages are complementary in size and position, such that a plurality of tie rod bores is defined, and a plurality of tie rods extending through respective ones of the plurality of tie rod bores.

\* \* \* \* \*